United States Patent [19]

Taylor et al.

[11] Patent Number: 4,730,706

[45] Date of Patent: Mar. 15, 1988

[54] SNUBBER WITH INTEGRAL TEST STRUCTURE

[75] Inventors: Douglas P. Taylor, N. Tonawanda, N.Y.; David A. Lee, Santa Monica, Calif.

[73] Assignee: Tayco Developments, Inc., North Tonawanda, N.Y.

[21] Appl. No.: 883,700

[22] Filed: Jul. 9, 1986

[51] Int. Cl.$^4$ ................................................ F16F 9/24
[52] U.S. Cl. .................................... 188/297; 188/279; 188/317
[58] Field of Search ............... 188/297, 311, 313, 317, 188/318, 279

[56] References Cited

U.S. PATENT DOCUMENTS

| | | | |
|---|---|---|---|
| 1,319,086 | 10/1919 | Jacques | 188/311 X |
| 2,122,407 | 7/1938 | Chisholm | 188/318 |
| 3,020,981 | 2/1962 | Day | 188/313 |
| 4,084,668 | 4/1978 | Rybicki | 188/318 X |

*Primary Examiner*—Joseph Falk
*Attorney, Agent, or Firm*—Joseph P. Gastel

[57] ABSTRACT

A snubber with an integral test structure which permits the snubber to be tested for drag, lockup and full load pressure characteristics without disconnecting it from between two external members between which it is mounted including a cylinder with opposite end walls, a piston mounted on a piston rod extending through the end walls and dividing the space between the end walls into first and second chambers which are filled with hydraulic fluid, a first clevis connecting one end of the piston rod to a first external member, a housing mounted for sliding movement on the cylinder and including a second clevis connecting it to a second external member, a plurality of selectively removable pins for fixedly attaching the housing to the cylinder or permitting it, when removed, to slide relative thereto, and ports in communication with the two chambers for conducting hydraulic liquid thereto or exhausting hydraulic liquid therefrom.

30 Claims, 7 Drawing Figures

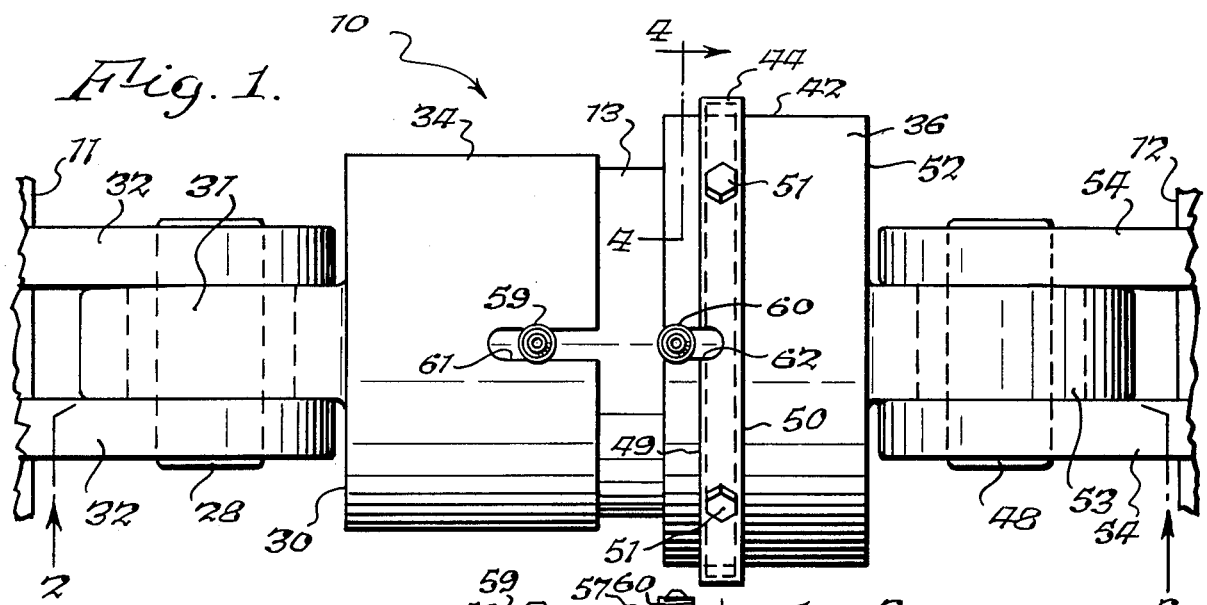
Fig. 1.
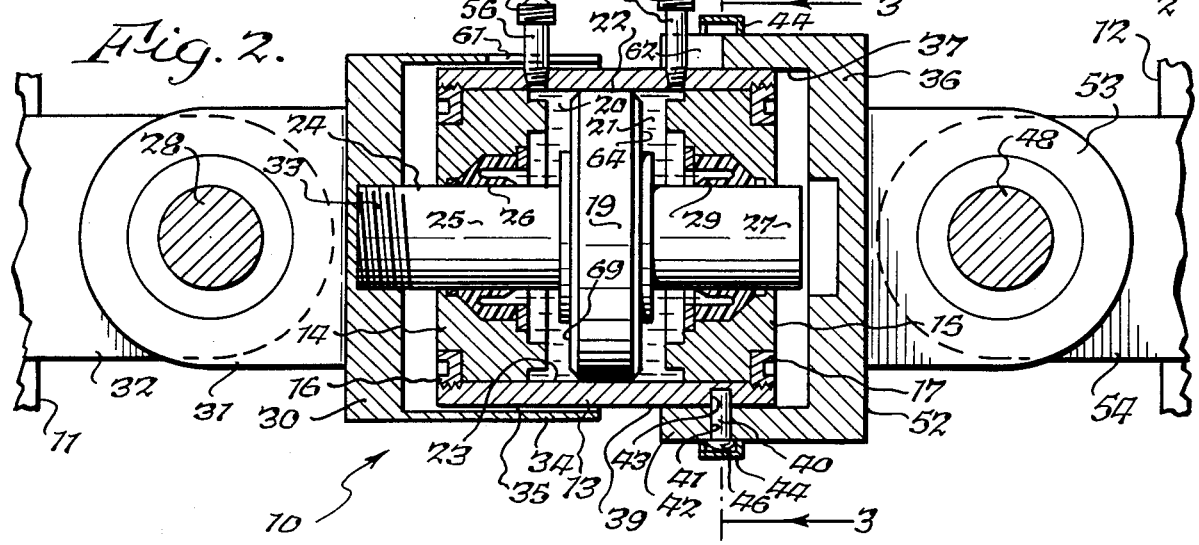
Fig. 2.
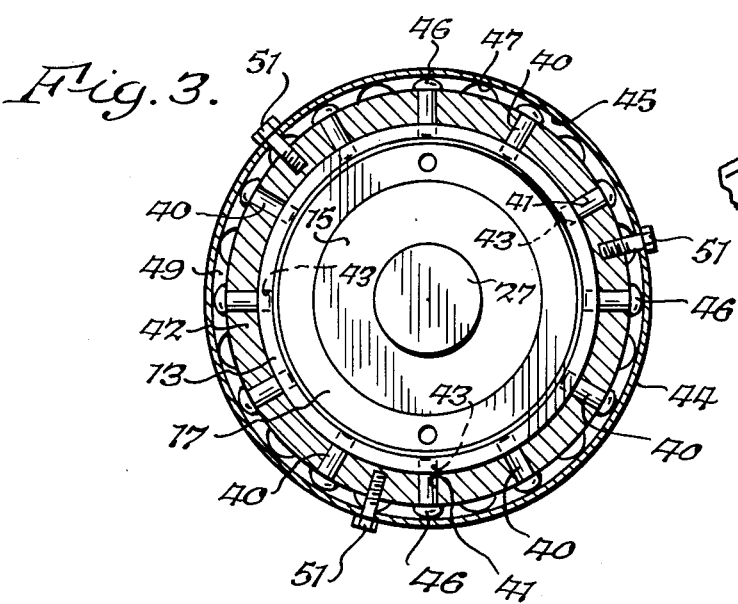
Fig. 3.
Fig. 4.

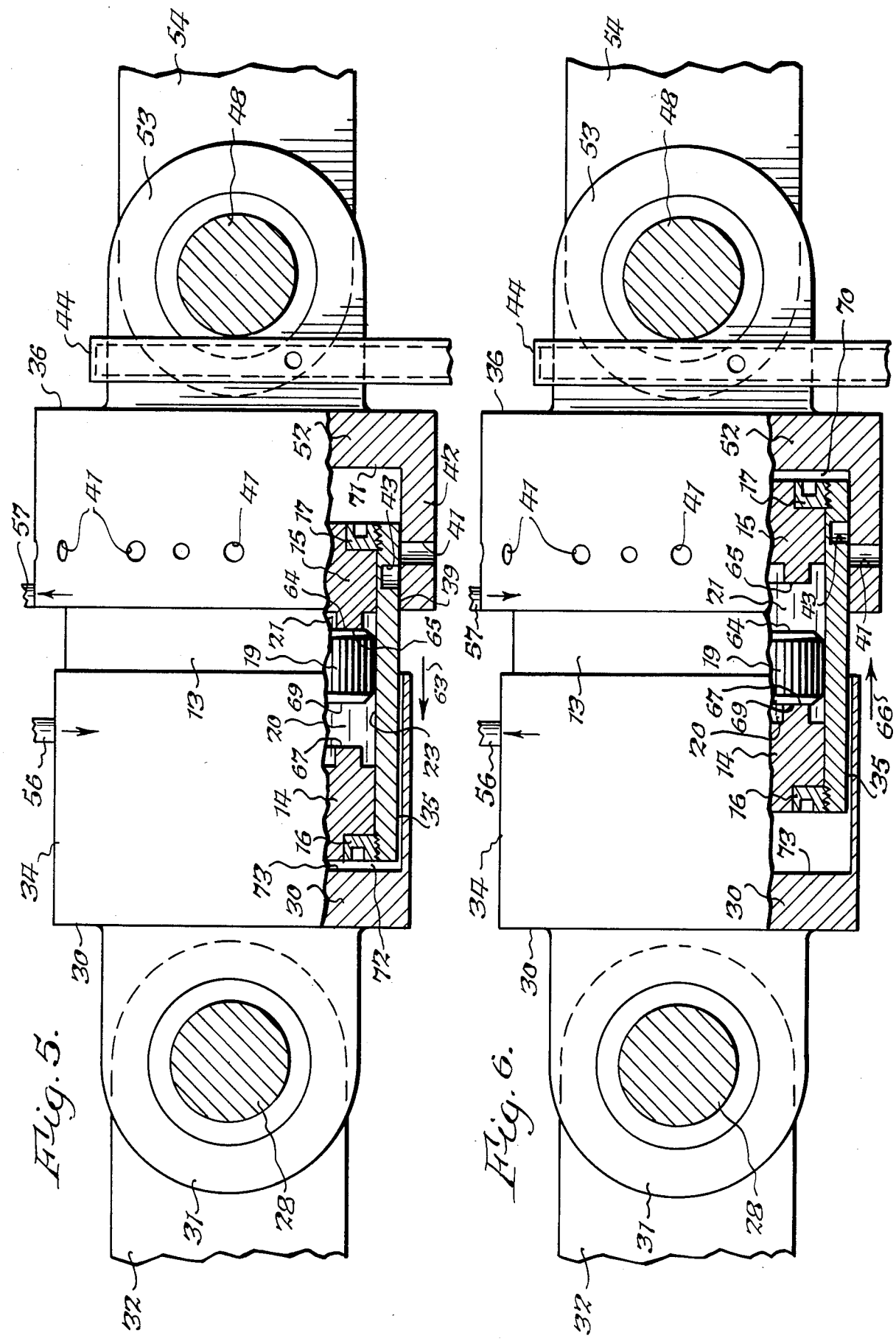

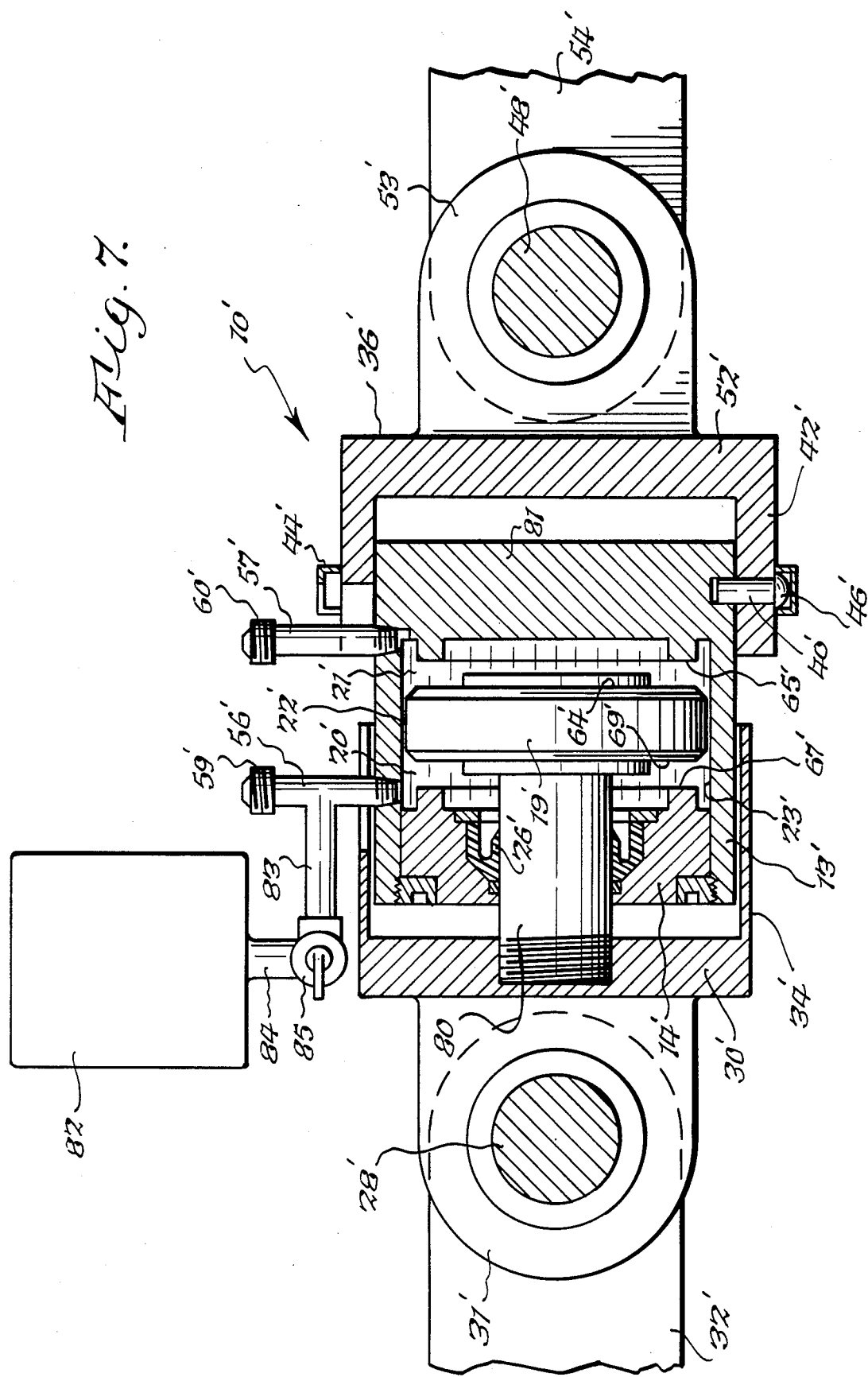

SNUBBER WITH INTEGRAL TEST STRUCTURE

BACKGROUND OF THE INVENTION

The present invention relates to a snubber with integral test structure.

By way of background, in the commercial power industry hydraulic snubbers are used in plant to mount and support pipes, steam generators, and other equipment relative to fixed structures such as walls. The snubbers permit relatively slow gradual movement between such mounted equipment and the fixed structure, but in the event the mounted equipment is subjected to an abrupt shock, the snubbers will effectively lock up to prevent abrupt relative movements which could result in damage of the mounted equipment.

By way of further background, the snubbers used in nuclear power plants usually require an annual inspection which tests their various physical characteristics including drag, lockup and full load pressure characteristics. Drag is the force required to overcome the friction experienced when moving the piston of the snubber. Lockup is the shock force at which the piston will not move relative to its cylinder. Full load pressure characteristic is the pressure which the hydraulic fluid can be subjected to at full load without accompanying seal leakage or parts breakage.

One way of testing in the past was to bench test by removing the clevis pins at the ends of the snubbers which connected them between the mounted equipment and the fixed structure, decontaminate the snubber if it was in nuclear containment, and thereafter put it into a mechanical tester and test it at the required velocity to get it to lock up, and to test it for friction to see whether it would stick or bind, and to test its full load output in a large press to determine whether there was any seal leakage or parts leakage. The testing included connecting a first chamber on one side of the piston to a high pressure fluid source and connecting a second chamber on the other side of the piston so that it could be exhausted. Thereafter, the pressure in the first chamber was increased gradually to determine the force required to overcome friction, the pressure was then increased abruptly to determine whether the snubber would lock up, and thereafter the piston was moved to the limit of its travel and the pressure was increased to a predetermined high value to test its full load characteristics, which included whether the seal in the first chamber would leak. Thereafter, the fluid connections to the first and second chambers were reversed and the foregoing tests were repeated. The work required to prepare the snubbers for actual testing was obviously very time-consuming and expensive.

Another prior method of testing the snubbers was to support the snubber, which could weigh up to about three tons, from underneath with a large jack, disconnect one clevis by removing its pin, and retracting the jack to drop the disconnected end of the snubber. Thereafter, it was tested in the same manner described above. While this procedure was an improvement over the earlier procedure which required decontamination, it still was subject to certain shortcomings, namely, that the snubber had to be disconnected and lowered by the use of a jack. Furthermore the procedure was rather time-consuming and, in addition, many snubbers, once installed, were not readily accessible so that a jack could be used to lower an end thereof after the snubber clevis had been disconnected. Accordingly, this required the still-connected snubbers to be tested in place, without disconnecting the clevis pins, which could result in breakage of the mounted equipment, especially considering that the snubbers had to be tested at full load, in accordance with testing requirements.

SUMMARY OF THE INVENTION

It is accordingly the primary object of the present invention to provide an improved snubber which includes integral test structure which permits the snubber to be tested without disconnecting it from its associated external members between which it is mounted.

It is another object of the present invention to provide an improved snubber with integral test structure which permits the snubber to be used in its conventional manner when the test structure is inoperative and in which the test structure can be rendered operative in an extremely simple and expedient manner. Other objects and attendant advantages of the present invention will readily be perceived hereafter.

The present invention relates to a snubber with integral test structure comprising a cylinder, first and second end walls in said cylinder, a piston in said cylinder between said first and second end walls, first and second chambers in said cylinder on opposite sides of said piston, a piston shaft mounting said piston and having a piston rod including a portion extending through said first end wall and having a piston rod end located outside of said cylinder on the opposite side of said first end wall from said piston, fluid in said cylinder in said first and second chambers on opposite sides of said piston, a seal in said first end wall surrounding said portion of said piston rod, first securing means for securing said piston rod end to a first external member, a housing, attachment means for selectively fixedly attaching said housing to said cylinder or permitting relative movement between said cylinder and said housing, and second securing means for securing said housing to a second external member.

The various aspects of the present invention will be more fully understood when the following portions of the specification are read in conjunction with the accompanying drawings wherein:

BRIEF DESCRIPTION OF THE DRAWINGS

FIG. 1 is a plan view of the improved snubber with integral test structure which permits it to be tested while attached between the external members with which it is associated;

FIG. 2 is a fragmentary cross sectional view taken substantially along 2—2 of FIG. 1;

FIG. 3 is a cross sectional view taken substantially along line 3—3 of FIG. 2;

FIG. 4 is a fragmentary side elevational view of the retaining ring taken substantially in the direction of arrows 4—4 of FIG. 1;

FIG. 5 is a fragmentary view, partially in cross section, similar to FIG. 2 but showing the relative positions of the various parts when high pressure test fluid is applied to a chamber on one side of the piston;

FIG. 6 is a view similar to FIG. 5 showing the relative positions of the various parts when high pressure fluid is applied to the chamber on the opposite side of the piston from that shown in FIG. 5; and FIG. 7 discloses the structure of the present invention applied to a snubber wherein the piston rod protrudes only from one end of the snubber.

DESCRIPTION OF THE PREFERRED EMBODIMENTS

The snubber 10 which includes integral test structure for testing various aspects thereof is shown in an installed operative position between two members, such as a pipe 11 and a wall 12 of a power plant. As noted above, the mounted member can be equipment other than a pipe, but a pipe is being used merely as an example. The function of the snubber is to support the pipe 11 while permitting it to move gradually relative to wall 12, but in the event pipe 11 tends to move at too rapid a rate toward or away from wall 12, snubber 10 will lock up to prevent such abrupt motion which could result in pipe breakage. As noted above, snubber 10 must be tested periodically for drag force, lockup, and full load pressure characteristics. The improved snubber 10 with integral test structure, permits this to be done without disconnecting it from external members 11 and 12.

The improved snubber 10 includes a cylinder 13 having end walls 14 and 15 which are sealed in fluid tight relationship relative to cylinder 13 and locked therein by retaining rings 16 and 17, respectively. A piston 19 is located within cylinder 13, and it divides the space between end walls 14 and 15 into chambers 20 and 21 which are filled with suitable hydraulic fluid, which may be radiation resistant silicone fluid, or it may be any other suitable hydraulic fluid, either compressible or incompressible. An uniform circumferential clearance 22 exists between the outer peripheral surface of generally cylindrical piston 19 and the inner wall 23 of cylinder 13 to permit the piston to move axially within cylinder 13 at a relatively slow rate, and during this movement fluid from the chamber into which piston 19 is traveling will move through the clearance 22 into the other chamber. However, if the movement should be too abrupt, that is if the piston 19 tends to travel above a predetermined velocity, it will lock up due to the hydraulic resistance of the fluid with a pressure drop across annular clearance 22 which is proportional to the fluid velocity squared. If desired, there can be communication between chambers 20 and 21 through a series of small ports in piston 19 itself and a seal may be located between the outer peripheral surface of piston 19 and inner wall surface 23. Alternatively, the piston may or may not be sealed at its outer periphery and it can contain integral snubbing hydraulic circuitry for permitting slow piston movement in both directions but preventing high velocity movement. The integral circuitry is conventional and may comprise one-way valve structure which permits flow from chamber 20 to chamber 21 and one-way valve structure which permits flow from chamber 21 to chamber 20, the one-way flow in each direction being permitted at low piston velocities. However, the one-way valves will close if the piston velocity should exceed a predetermined value. In fact, any suitable flow arrangement can be used which permits flow between chambers 20 and 21 at low piston velocities and which causes the piston to lock up if its velocity is above a predetermined value.

Piston 19 is fixedly mounted against axial movement on piston rod 24, which has a first portion 25 which extends through seal 26 in end wall 14, and it also includes an end portion 27 which extends through seal 29 in end wall 15. A construction wherein piston rod end portion 27 is supported in a seal is desirable where a clearance 22 exists because it serves to center the piston 19 within cylinder 13. Seals 26 and 29 are preferably of the construction disclosed in U.S. Pat. No. 3,256,005, which is incorporated herein by reference.

The outer end of piston rod portion 25 is rigidly attached to plate 30 which forms a part of clevis 31, the other portions 32 of which are connected to external member 11, which may be a pipe. The connection between piston rod portion 25 and plate 30 may be by means of a threaded joint 33, or by any other suitable means. A skirt 34 is attached to plate 30 and serves merely to shield the end of cylinder 13 which it encloses, and there is preferably a clearance 35 between skirt 34 and cylinder 13 so that there is no friction therebetween.

In accordance with the present invention, the integral test structure includes a housing 36 rigidly attached to cylinder 13 when the snubber 10 is in its operative snubbing position between external members 11 and 12. However, housing 36 is selectively uncoupled from cylinder 13 to permit a sliding engagement between internal surface 37 of housing 36 and external surface 39 of cylinder 13 when the snubber is to be tested. The detachable connection is effected by a plurality of circumferentially extending retaining pins 40 which are installed through bores 41 in annular housing portion 42 and are received in aligned blind bores 43 in cylinder 13. The pins 40 are retained in position by a retaining ring 44 having an inner surface 45 which bears against heads 46 of pins 40. The retaining ring 44 is installed by moving it from right to left in FIG. 2 when the scallops 47 are in line with pin heads 46 until the latter are located proximate solid end wall 50, and thereafter retaining ring 44 is moved circumferentially so that pins 40 will be located between wall 50 and the solid portions of wall 49. A plurality of screws 51 are thereafter installed as shown in FIG. 3 to hold the retaining ring in position to prevent the pins from moving out of their locking engagement. Housing end wall 52 is rigidly secured to clevis portion 53 which coacts with clevis portions 54 which are attached to external member 12, which may be a building wall. Other means may be used to attach housing 36 to cylinder 13.

As shown in FIGS. 1 and 2, snubber 10 is in operative position between external members 11 and 12 to permit gradual movement therebetween but to prevent movement by locking up in the event they are subjected to abrupt shocks, that is if the relative velocity between piston 19 and cylinder 13 exceeds a predetermined value. When it is desired to test snubber 10 for drag force, lockup and full load pressure characteristics of seals 26 and 29, the following procedure is used, and it is to be especially noted that clevis pins 28 and 48 are not removed, and thus snubber 10 is not disconnected from external members 11 and 12. First of all, the retaining ring 44 is moved from the position shown in FIGS. 1 and 2 to the positions shown in FIGS. 5 and 6. This is achieved by removing screws 51, rotating ring 44 until scallops 47 are in line with the heads 46 of pins 40 and thereafter moving retaining ring 44 to the right. After retaining ring 44 has been moved, pins 40 may be withdrawn from their associated bores, thereby leaving sleeve portion 42 of housing 36 free to slide relative to cylinder 13. Thereafter, a hose (not shown) from a high pressure source of hydraulic fluid (not shown) is attached to fitting 56 which is mounted on cylinder 13 and which effects communication between the hose and chamber 20. At the same time a second hose is applied to fitting 57 to permit it to exhaust the fluid from chamber 21 with which it is in communication. Fittings 56 and 57 form a permanent part of snubber 10. They may include internal valve structure which prevents flow of fluid from chambers 20 and 21 when an external hose is not attached thereto but which will permit communication with these chambers when external hoses containing valve opening structure is screwed on to the outer ends 59 and 60 of fittings 56 and 57, respectively. Alternatively, fittings 56 and 57 may be simple nipples which are closed by sealing caps (not shown) mounted on the outer threaded end portions 59 and 60 and which are removed when the above-described hose connections are made. As can be seen from FIGS. 1 and 2, skirt 34 and sleeve 36 are slotted at 61 and 62, respectively, to permit skirt 34 and sleeve 42 to move relative to fittings 56 and 57, respectively.

When high pressure fluid is introduced into chamber 20 and chamber 21 is permitted to be exhausted (FIG. 5), cylinder 13 will move in the direction of arrow 63 until the side 64 of piston 19 abuts annular wall portion 65 of end wall 15. While the pressure in chamber 20 is relatively low, the drag force can be measured. In this regard, the drag force will be the amount of force which is required to move the cylinder 13 relative to piston 19, and the drag force includes the frictional force between the piston rod 24 and the seals 26 and 29, as well as the frictional force between any other relatively movable portions. In this regard it is to be noted that the friction associated with the sliding connection between sleeve 42 and cylinder 13 is relatively low and thus will not contribute a significant resistance during the test. The lockup characeristic is tested by pressurizing chamber 20 with a high fluid flow rate to simulate an abrupt high velocity movement between the piston 19 and cylinder 13. After the side 64 of piston 19 engages annular end wall portion 65, the pressure in chamber 20 is increased to its full load value to test the full load characteristics of the snubber under a pressure which simulates maximum load. If it does not leak, then it is satisfactory.

After the foregoing test has been made, as described above, the high pressure source of fluid is connected to fitting 57 and fitting 56 is placed in communication with a receptacle to receive the fluid therefrom. The high pressure fluid is then admitted to chamber 21 which will cause cylinder 13 to move in the direction of arrow 66 (FIG. 6) until the annular end wall portion 67 engages side wall 69 of piston 19. During the movement of cylinder 13, the drag force and the lockup characteristics are tested as described above. After piston side wall 69 and annular end wall portion 67 are in abutting engagement, the pressure in chamber 21 is increased to its full load value to test the full load characteristics under a pressure which simulates maximum load. If it does not leak, it is satisfactory.

The foregoing high pressure maximum loading test, as depicted in FIGS. 5 and 6, is possible because there is a clearance 70 (FIG. 6) between end wall 15 and wall surface 71 of housing 36 when side 69 of piston 19 engages annular wall portion 67 of the end wall; and because there is a clearance 72 (FIG. 5) between wall surface 73 and end wall 14 when side 64 of piston 19 engages annular wall surface 65 of end wall 15.

If the snubber 10 tests satisfactorily, it is returned to the condition shown in FIGS. 1 and 2. This is effected by venting fitting 57 to permit chamber 21 to bleed while filling chamber 20 with hydraulic fluid until cylinder 13 assumes the position generally close to that shown in FIG. 2. Thereafter, a drift pin may be inserted through one or more substantially aligned bores 41 and 43 to bring them into exact alignment, after which pins 40 are installed to the positions shown in FIGS. 2 and 3. The retaining ring is then mounted over the heads 46 of pins 40 in the manner described above, namely, by moving the retaining ring 44 so that the pin heads 46 pass through scallops 47 and thereafter rotating retaining ring 44 so that screws 51 may be installed.

In FIG. 7 an alternate embodiment of the present invention is disclosed wherein the integral test structure, which is identical to that described above relative to FIGS. 1-6, is used in conjunction with a snubber 10' wherein the piston rod 80 extends only through one end wall 14', and the other end wall 81 is solid. In the interest of brevity, primed numerals are applied to FIG. 7 which designate identical structure to that denoted by unprimed numerals in FIGS. 1-6.

In FIG. 7 piston 19' is supported only by shaft 80 which extends through seal 26' in end wall 14'. However, since the volume of chambers 20' and 21' varies with the amount of piston 80 within the cylinder 13', an accumulator 82 is in communication with test pipe 83 (which is analogous to pipe 56 of FIGS. 1-6) through conduits 83 and 84 and valve 85. During normal snubber operation valve 85 is open and a cap is mounted on threads 59' so that fluid from chamber 20' can communicate with the accumulator through conduits 56', 83 and 84 and through open valve 85. However, when the snubber is to be tested, valve 85 is closed, and the testing of the snubber 10' is effected in the manner described above relative to FIGS. 1-6.

It can thus be seen that the snubbers 10 and 10' can be tested for drag force, lockup and full load characteristics without disassembling the clevises at opposite ends thereof which mount the snubbers between external members, such as 11 and 12. Furthermore, while the connections between snubbers 10 and 10' and external members 11 and 12 have been shown as clevises, it will be appreciated that the clevises have been shown merely by way of example but that other types of connections may be used, as required.

While the snubber with integral test structure has been described with respect to a commercial power plant, it will be appreciated that it can also be used in other applications. Furthermore, the snubbers of the present invention may be of any size including but not limited to a length of about one foot and weighing only a few pounds to a length of about eighteen feet and weighing about three tons.

While preferred embodiments of the present invention has been disclosed, it will be appreciated that it is not limited thereto, but may be otherwise embodied within the scope of the following claims.

What is claimed is:

1. A snubber for connection between first and second relatively movable external members and having structure which permits said snubber to be tested without being disconnected from said first and second external members comprising a cylinder, first and second end walls in said cylinder, a piston in said cylinder between said first and second end walls, first and second chambers in said cylinder on opposite sides of said piston, a piston rod mounting said piston and having a piston rod portion extending through said first end wall and having a piston rod end located outside of said cylinder on the opposite side of said first end wall from said piston, fluid in said cylinder in said first and second chambers on opposite sides of said piston, a seal in said first end wall surrounding said piston rod portion, first securing means for securing said piston rod end to said first external member, a housing for attachment to said cylinder, attachment means for selectively fixedly attaching said housing to said cylinder to cause both to act as a unit for normal buffer operation and for detaching said housing from said cylinder for permitting relative movement between said cylinder and said housing for testing of said snubber, support means for causing said housing to support said cylinder after said attachment means detach said housing form said cylinder to permit said relative movement therebetween, and second securing means for securing said housing to said second external member whereby said cylinder can be supported for relative movement in said housing while said first and second securing means maintain their connections with said first and second external members, respectively.

2. A snubber as set forth in claim 1 including first and second ports in said cylinder in communication with said first and second chambers, respectively, for receiving hydraulic fluid for testing said snubber when said cylinder is detached from said housing but is supported thereby.

3. A snubber as set forth in claim 1 wherein said support means comprise a slidable connection between said cylinder and said housing to permit said relative movement therebetween when said attachment means do not fixedly attach said housing to said cylinder.

4. A snubber as set forth in claim 3 including first and second ports in said cylinder in communication with said first and second chambers, respectively, for receiving hydraulic fluid for testing said snubber when said cylinder is detached from said housing but is supported thereby.

5. A snubber as set forth in claim 1 wherein said second securing means are located on the opposite side of said second end wall from said piston.

6. A snubber as set forth in claim 1 wherein said piston rod includes a second portion extending through said second end wall, and a second seal in said second end wall surrounding said second portion of said piston rod.

7. A snubber as set forth in claim 6 including first and second ports in said cylinder in communication with said first and second chambers, respectively, for receiving hydraulic fluid for testing said snubber when said cylinder is detached from said housing but is supported thereby.

8. A snubber as set forth in claim 7 wherein said support means comprise a slidable connection between said cylinder and said housing to permit said relative movement therebetween when said attachment means do not fixedly attach said housing to said cylinder.

9. A snubber as set forth in claim 1 wherein said first and second securing means comprise clevises.

10. A snubber as set forth in claim 1 wherein said attachment means comprise a plurality of removable pins extending between said housing and said cylinder.

11. A snubber as set forth in claim 10 wherein said plurality of pins extend circumferentially around said cylinder.

12. A snubber as set forth in claim 11 including a retaining ring for retaining said plurality of pins in position between said cylinder and said housing.

13. A snubber as set forth in claim 11 wherein said piston rod includes a second portion extending through said second end wall, and a second seal in said second end wall surrounding said second portion of said piston rod.

14. A snubber as set forth in claim 13 including first and second ports in said cylinder in communication with said first and second chambers, respectively, for receiving hydraulic fluid for testing said snubber when said cylinder is detached from said housing but is supported thereby.

15. A snubber as set forth in claim 14 wherein said support means comprise a slidable connection between said cylinder and said housing to permit said relative movement therebetween when said attachment means do not fixedly attach said housing to said cylinder.

16. A snubber as set forth in claim 1 including first and second internal surfaces on said first and second end walls, respectively, forming borders of said first and second chambers, respectively, and a clearance between said first end wall and said first securing means when said piston is in engagement with said second internal surface.

17. A snubber as set forth in claim 1 including first and second ports in said cylinder in communication with said first and second chambers, respectively, for receiving hydraulic fluid for testing said snubber when said cylinder is detached from said housing but is supported thereby, first and second internal surfaces on said first and second end walls, respectively, forming borders of said first and second chambers, respectively, a first clearance between said first end wall and said first securing means when said piston is in engaement with said second internal surface, and a second clearance between said second end wall and said housing when said piston is in engagement with said first end wall.

18. A snubber as set forth in claim 17 wherein said support means comprise a slidable connection between said cylinder and said housing to permit said relative movement therebetween when said attachment means do not fixedly attach said housing to said cylinder.

19. A snubber as set forth in claim 17 wherein said piston rod includes a second portion extending through said second end wall, and a second seal in said second end wall surrounding said second portion of said piston rod.

20. A snubber for connection between first and second relatively movable external members and having structure which permits said snubber to be tested without being disconnected from said first and second external members comprising a cylinder, first and second end wall in said cylinder, a piston in said cylinder between said first and second end wall, a chamber in said cylinder on opposite side of said piston from said first end wall, a piston rod mounting said piston and having a piston rod portion extending through said first end wall and having a piston rod end located outside of said cylinder on the opposite side of said first end wall from said piston, fluid in said chamber, a seal in said first end wall surrounding said piston rod portion, first securing means for securing said piston rod end to said first external member, a housing for attachment to said cylinder, attachment means for selectively fixedly attaching said housing to said cylinder to cause both to act as a unit for normal buffer operation and for detaching said housing from said cylinder for permitting relative movement between said cylinder and said housing for testing of said snubber, support means for causing said housing to support said cylinder after said attachment means detach said housing from said cylinder to permit said relative movement therebetween, and second securing means for securing said housing to said second external member whereby said cylinder can be supported for relative movement in said housing while said first and second securing means maintain their connection with said first and second external members, respectively.

21. A snubber as set forth in claim 20 wherein said support means comprise a slidable connection between said cylinder and said housing to permit said relative movement therebetween when said attachment means do not fixedly attach said housing to said cylinder.

22. A snubber as set forth in claim 20 including a first port in said cylinder in communication with said chamber, respectively, and a second port in said cylinder in communication with a space between said first end wall and said piston.

23. In an environment wherein a first member is secured relative to a second member and wherein gradual movement therebetween is permissible but abrupt movement above a predetermined velocity is to be prevented, a snubber with structure for securing said first member to said second member and for permitting testing of said snubber without disconnecting said snubber from said first and second members comprising a cylinder, first and second end walls in said cylinder, a piston in said cylinder between said first and second end walls, first and second chambers in said cylinders on opposite sides of said piston, a piston rod mounting said piston and including a piston rod portion extending through said first end wall and having a piston rod end located outside of said cylinder on the opposite side of said first end wall from said piston, fluid in said cylinder in said first and second chambers on opposite sides of said piston, a seal in said first end wall surrounding said portion of said piston rod, first securing means for securing said piston rod end to said first member, a housing for attachment to said cylinder, attachment means for selectively fixedly attaching said housing to said cylinder to cause both to act as a unit for normal buffer operation and for detaching said housing from said cylinder for permitting relative movement between said cylinder and said housing for testing of said snubber, support means for causing said housing to support said cylinder after said attachment means detach said housing from said cylinder to permit said relative movement therebetween, and second securing means for securing said housing to said second member whereby said cylinder can be supported for relative movement in said housing while said first and second securing means maintain their connections with said first and second members, respectively.

24. A snubber as set forth in claim 23 including first and second ports in said cylinder in communications with said first and second chambers, respectively, for receiving hydraulic fluid for testing said snubber when said cylinder is detached from said housing but is supported thereby.

25. A snubber as set forth in claim 24 wherein said support means comprise a slidable connection between said cylinder and said housing to permit said relative movement therebetween when said attachment means do not fixedly attach said housing to said cylinder.

26. A snubber as set forth in claim 23 wherein said piston rod includes a second portion extending through said second end wall, and a second seal in said second end wall surrounding said second portion of said piston rod.

27. A snubber as set forth in claim 26 including first and second ports in said cylinder in communication with said first and second chambers, respectively, for receiving hydraulic fluid for testing said snubber when said cylinder is detached from said housing but is supported thereby.

28. A method of operating and testing a snubber attached between first and second relatively movable external members and having a piston and cylinder unit consisting of a cylinder with a relatively movable piston therein and fluid chambers with fluid therein on opposite sides of said piston within said cylinder, said testing being effected without detaching said piston and cylinder unit from said first and second external members between which it is attached during normal snubber operation, comprising the steps of operating said snubber by firmly connecting said piston and cylinder unit to function as a unit between said first and second external members to cause said piston to move relative to said cylinder only when said first and second external members move relative to each other, said testing of said snubber including the steps of effectively disconnecting said piston and cylinder unit from between said first and second external members while it remains attached therebetween to permit said piston to move relative to said cylinder for testing purposes while said first and second external members do not move relative to each other, supporting said piston and cylinder unit for said relative movement while said piston and cylinder unit remains effectively disconnected during said testing of said snubber, and pumping fluid into one of said chambers while exhausting fluid from the other of said chambers to effect said relative movement between said cylinder and said piston in one direction while said piston and cylinder unit remains effectively disconnected from said first and second external members and while it remains attached between said first and second external members to thereby test said snubber.

29. A method as set forth in claim 28 including the step of pumping fluid into the other of said chambers while exhausting fluid from said one of said chambers to thereby effect relative movement between said piston and cylinder in a direction which is opposite to said one direction.

30. A method as set forth in claim 29 wherein said pumping and exhausting of fluid is effected to move said piston relative to said cylinder to the limit of its travel in both directions.

* * * * *

UNITED STATES PATENT AND TRADEMARK OFFICE
CERTIFICATE OF CORRECTION

PATENT NO. : 4,730,706

DATED : March 15, 1988

INVENTOR(S) : Douglas P. Taylor and David A. Lee

It is certified that error appears in the above-identified patent and that said Letters Patent is hereby corrected as shown below:

Column 7, line 12 (claim 1), change "form" to --from--.

Column 8, line 49 (claim 20), change "wall" to --walls--;
          line 50 (claim 20), change "wall" to --walls--.

Signed and Sealed this

Twenty-sixth Day of July, 1988

Attest:

DONALD J. QUIGG

Attesting Officer        Commissioner of Patents and Trademarks